March 3, 1970

3,499,157

LIGHT INTENSITY AMPLIFYING DEVICE UTILIZING A SEMICONDUCTOR
ELECTRON-SENSITIVE VARIABLE RESISTANCE LAYER

Filed Aug. 12, 1965

INVENTORS.
KIMIHIKO SATAKE
HIROMITSU SHIRAKI
MASAYOSHI OZAWA

BY Hopgood & Calimafde
ATTORNEYS.

INVENTORS.
KIMIHIKO SATAKE
HIROMITSU SHIRAKI
MASAYOSHI OZAWA
BY
Hopgood & Calimafde
ATTORNEYS.

United States Patent Office 3,499,157
Patented Mar. 3, 1970

3,499,157
LIGHT INTENSITY AMPLIFYING DEVICE UTILIZING A SEMICONDUCTOR ELECTRON-SENSITIVE VARIABLE RESISTANCE LAYER
Kimihiko Satake, Hiromitsu Shiraki, and Masayoshi Ozawa, Tokyo, Japan, assignors to Nippon Electric Company Limited, Tokyo, Japan, a corporation of Japan
Filed Aug. 12, 1965, Ser. No. 479,215
Claims priority, application Japan, Aug. 18, 1964, 39/47,317, 39/47,318, 39/47,319; Oct. 2, 1964, 39/56,366
Int. Cl. H01j 31/50, 39/12; G02f 1/18
U.S. Cl. 250—213
2 Claims

ABSTRACT OF THE DISCLOSURE

A light amplifying device is described wherein a multilayer light polarizing structure is used comprising a variable resistance layer and a light polarizing layer and wherein a voltage is applied to electrodes sandwiching these layers so that light from a linearly polarized beam directed at the polarizing layer will be reflected back through the polarizing layer with its polarization altered. The change in polarization is detected so that an intensity-amplified image may be produced. In one embodiment, the resistance of the variable resistance layer is changed in response to photons, and in an alternate embodiment, electrons produce the change in resistance.

---

This invention relates to an optical image intensifying device, and is particularly applicable to such a device which is capable of reversing the light and shade portions of the optical image therein.

As those knowledgeable in the art are aware, there are various conventional devices for optical image amplification. One such conventional device is constructed so that the photoelectron beam emitted from a photoelectron-emissive surface or photocathode in response to an optical image projected thereon, is accelerated to strike a fluorescent surface. In another of these conventional devices, the photoelectron beam similarly produced may be subjected to secondary-electron multiplication before striking the fluorescent surface. In still another, which comprises the above described devices disposed in series, one of which utilizes a photoconductive layer, the optical image is projected thereon so as to locally vary the conductivity and to form a voltage pattern on an electroluminescent layer superimposed on the former. These conventional devices, however, have the disadvantages that the background noise in the output intensified optical image cannot be eliminated, and that the desired degree of high resolving power cannot be attained. Furthermore the manufacture of such devices of satisfactory quality cannot be accomplished without considerable manufacturing difficulty.

Additionally, the conventional devices for reversing the light and shade portions of the optical image, which typically utilize the quenching phenomena of a fluorescent material and have a photoconductive layer and an electroluminescent layer superimposed thereon, have as in the case of the optical image intensifying devices referred to above, the technical disadvantages of low intensity and insufficient resolving power.

Accordingly, it is an object of this invention to provide a device for intensifying an optical image either with or without means for reversing of the light and shade portions thereof, which device has very low background noise and improved image intensification.

Figure 1:
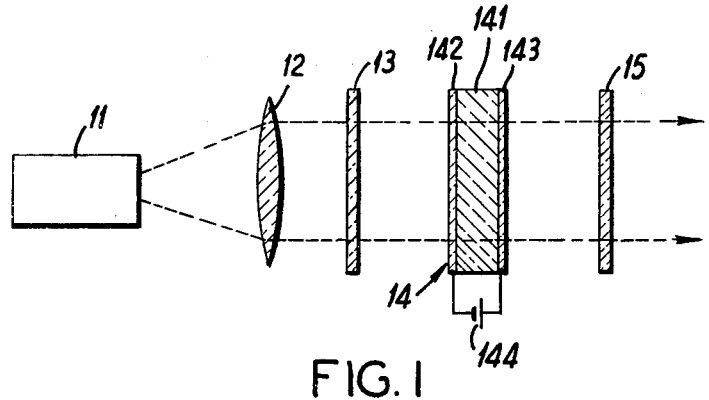
Figure 2:
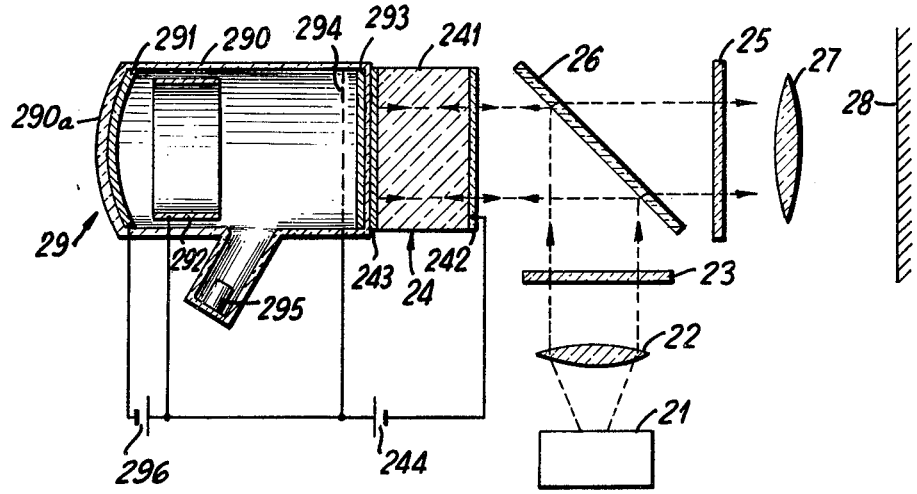
Figure 3:
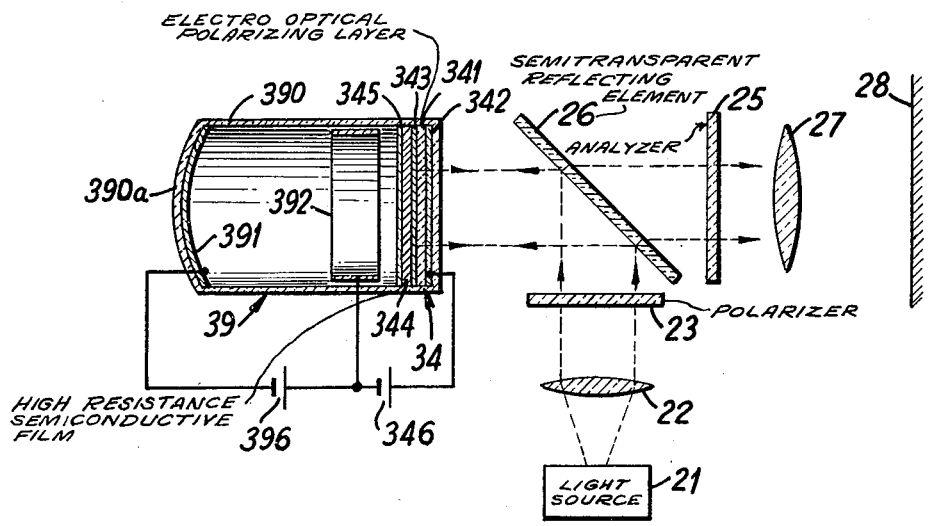
Figure 4:
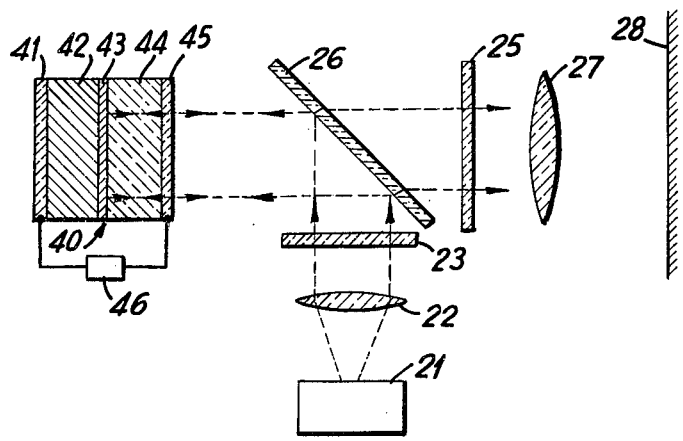

All of the objects, features and advantages of this invention and the manner of attaining them will become more apparent and the invention itself will be best understood by reference to the following description of an embodiment of the invention taken in conjunction with the accompanying drawing, in which FIG. 1 is a schematic drawing useful in explaining a basic principle of the invention, and FIGS. 2, 3, and 4 show schematic longitudinal sections of first, second, and third embodiments of the invention, respectively.

In accordance with an aspect of the invention, the novel device comprises a first portion having electro-optical means responsive to a control voltage applied thereto, for subjecting input linearly polarized rays caused to pass therethrough to rotation of the plane of polarization, and photoelectric means responsive to an optical image projected thereon to be processed, for producing an electric field intensity pattern within said electro-optical means. Also provided is a second portion having light source means, including a polarizer, for causing a linearly polarized pencil light beam to pass through said electro-optical means, and utilization means, including an analyzer, for deriving the processed optical image through said rotation of the plane of polarization of said light beams and through crossed polarizer analyzer action.

Further, according to the invention, the novel device produces an intensified optical image, regardless of how faint the optical image to be processed may be, and this is accomplished with low noise and high revolving power. There is also provided optical image intensifying means which can also reverse the light and shade portions of the optical image, merely by arranging the polarization direction of the polarizer and the analyzer, i.e. it can thereby produce a negative from a positive picture and vice versa.

Referring now to FIG. 1, a light beam is emitted from a light source 11 and is condensed to form a parallel ray beam by means of an optical lens 12. This light beam is then converted to linearly polarized rays by means of a polarizer 13 placed perpendicular to the parallel rays, and then projected on an intensity control element 14 for controllably causing rotation of the plane of polarization in a manner to be set forth. The light beam passes through the element 14 and further passes through an analyzer 15 which is similar to the polarizer 13. The beam which emerges from the analyzer 15 is the output light beam.

The control element 14 comprises a body of material 141 capable of producing a considerable electro-optical effect to cause rotation of the plane of polarization in accordance with a voltage applied thereacross, a pair of transparent thin film electrodes 142 and 143 secured to opposed surfaces of the element or material 141, and a voltage source connected to the electrodes 142 and 143 for forming an electric field within the element 141. The preferred material among the available materials for use as the element 141 is a KDP (potassium dihydrogen phosphate $KH_2PO_4$) crystal. A detailed description of the KDP crystal may be found in "Journal of the Optical Society of America," vol. 39, No. 10, October 1949, pp. 802–808, and in "Proceedings of the I.R.E.," vol. 50, No. 4, April 1962, pp. 452–456, and accordingly only a brief description of the crystal element is set forth herein. Briefly, the element 14 has two parallel surfaces which are formed perpendicular to the optical axis, and serve to subject the input light beam, which is incident perpendicularly on one of the surfaces, to rotation of the plane of polarization in response to the voltage applied across the surfaces. Therefore, the intensity of the output light of the analyzer 15 varies in response to the control voltage.

Referring now to FIG. 2, a first embodiment of the invention is shown which comprises a light source 21, a lens 22, a polarizer 23, a semi-transparent reflecting member 26, an intensity control element 24, an analyzer 25, another lens 27, and a screen 28. The control element 24 includes a material or element 241 identical to the element 141 of FIG. 1, a transparent electrode 242, and a reflecting layer 243, these being formed on opposed surfaces of the element 241. A photo-electric conversion device 29 is placed in contact with the outer surface of the control element 24.

This conversion device 29 comprises, within a glass envelope 290, a photoelectron-emissive material (or a photocathode) 291, a photoelectron accelerating member 292 (which also serves as an electron focussing means in cooperation with a hollow cylindrical magnetic focussing means, not shown, which surrounds the envelope 290), a secondary electron emissive material 293 which is adjacent the reflecting layer 243 but separated therefrom by a portion of the envelope 290, and which emits secondary electrons in response to bombardment by the photoelectrons, a secondary electron capturing member or collector 294, and an electron beam source 295 for producing an electron beam for elimination of the electron charge pattern formed on the material 293.

An accelerating voltage source 296 is provided for supplying the accelerating member 292 with an electron-accelerating voltage. Another voltage source 244 is connected between the secondary electron collector 294 and the transparent electrode 242, this source being identical to the source 144 of FIG. 1. The element 24 is arranged in a manner so that the polarized light beam from the reflecting member 26 is incident perpendicularly upon the transparent electrode 242, and so that the end surface of the device 290 adjacent the surface 293 is positioned immediately adjacent the reflecting layer 243 of the element 24.

In operation, an optical image is projected on the left end surface 290a of the envelope 290 by means of any suitable optical system, not shown. This causes the secondary electron emissive material 291 to produce a photoelectron beam pattern (or an electron density pattern) which is representative of the optical image. The photoelectrons of the beam are accelerated by the accelerating potential on the electrode 292 and caused to strike the secondary-electron emissive material 293 to produce secondary electron emission. The secondary electrons thus produced are captured by the collector 294 to develop an electric charge pattern representative of the beam pattern (or the electron density pattern). When the potential distribution on the surface of the collector 294 is uniform, the voltage supplied between the transparent electrode 242 and the collector 294 produces within the element 241 an electric field which is uniform in the direction of the surface of the element 241. However, inasmuch as the potential distribution on the collector 294 depends on the beam pattern and consequently on the optical image, the electric field is not uniform in the direction of the surface, with the result that the electric field intensity pattern representative of the optical image is formed within the element 241.

On the other hand, the linearly-polarized parallel rays incident upon the intensity control element 24 from the semi-transparent reflecting member 26 are subjected within the element 241 to rotation of the plane of polarization, reflected by the reflecting layer 243, again subjected to rotation of the plane of polarization, and then appear at the right-hand side of the electrode 242. The light beams from the element 24 then pass through the reflecting member 26, are discriminated by means of the analyzer 25 depending on the degree of rotation of the plane of polarization, and are then projected onto the screen 28 by means of the lens 27. Inasmuch as the polarized rays from the element 24 have various components of the polarization direction in response to the abovementioned electric field pattern, the light beam emerging from the analyzer 25 represents an intensified replica of the original optical image on the envelope surface 290a, when projected on the screen 28.

More specifically, the voltage of the source 244 is determined so that rotation of the plane of polarization corresponding to the high light portion (maximum luminance portion) is 90° with respect to the original plane of polarization. When the analyzer is positioned in the crossed polarizer-analyzer relative position, the output image portion corresponding to the high light portion becomes most luminous.

It will be understood from the foregoing that the luminance of the intensified replica of the original optical image does not depend on the luminance of the original image but on the intensity of illumination by the light source 21, and that substantial intensification can be obtained even if the luminance of the optical image is extremely low.

As regards the electron beam source 295 which eliminates the electron charge pattern formed on the surface of the material 293, inasmuch as the secondary-electron emission ratio R as to the photoelectrons is greater than unity, it is only necessary for the elimination source 295 to generate such an eliminating electron beam as to make the ratio R smaller than unity so as to scan the surface of the secondary electron emissive material 293. Moreover, if the secondary electron emission ratio R as to the photo-electrons is not greater than unity, the secondary electron capturing member or collector 294 is not necessary. In such case, the secondary electron emissive material 293 and the transparent electrode 242 would constitute the electrodes between which the voltage is supplied from the voltage source 244.

In the above described embodiment of FIG. 2, the element 24 may be enclosed within the envelope 290 of the device 29. Moreover, the flat portion of the envelope 290 between the secondary electron emissive material 293 and the reflecting layer 243 may be replaced with a thinner plate of other suitable insulation material such as, for example, mica or ceramic.

With this embodiment, the signal to noise ratio of the electron signal generated by the emissive material 291 is improved by suitably cooling the material 291 and the element 24. Such cooling also reduces the value of the voltage required from the source 244.

Referring now to FIG. 3, there is shown a second embodiment of the invention wherein similar parts to those of FIG. 2 are designated with like reference numerals, and wherein similar reference numerals having the least significant and second least signifcant digits identical to those of FIG. 2 are employed for the photoelectric conversion device. This second embodiment comprises a photoelectric conversion device 39 which comprises, within a glass envelope 390, a photoelectron emissive material 391, an accelerating electrode 392, and a hollow cylindrical magnetic focussing means not shown. Also provided is an intensity control element 34 which is also disposed within the glass envelope 390 and composed of a transparent thin film electrode 345, a high-resistance semiconductor film 344 of antimony trisulfide ($Sb_2S_3$) or selenium, a flat reflecting layer 343, an element 341 identical to the above-described elements 141 and 241, and a transparent film electrode 342. A voltage source 396 is connected between the material 391 and the electrode 392 so as to supply the photoelectron accelerating voltage therebetween. Another voltage source 346 is connected between the electrode 392 and the transparent electrode 342. The optical system on the right-hand side of the drawing is identical to that shown in FIG. 2, and has already been described.

When an optical image is projected, by means of an optical system not shown, on the left end surface 390a of the envelope 390, the photoelectron beam is produced and then accelerated to reach the transparent electrode 345. On the electrode 345, therefore, a photoelectron density pattern representative of the original optical image is produced. The semiconductor film 344 has an electric conductivity which varies in response to the photoelectron density, and therefore a voltage pattern or an electric field intensity pattern is produced within the element 341. Therefore, the degree of the polarization-plane rotation of the linearly polarized rays is controlled in response to the varying conductivity, with the result that the intensified replica of the original optical image can be obtained at the screen 28 with crossed polarizer-analyzer relative relation.

Although the photoelectric conversion devices 29 and 39 are employed in the above embodiments for the purpose of developing within the intensity control elements 24 and 34 the voltage or electric field intensity pattern, an entirely solid state device may be substituted for such photoelectric conversion devices.

Referring now to FIG. 4, there is shown a third embodiment of the invention in which similar parts to those of FIGS. 2 and 3 are designed with like reference numerals. This third embodiment comprises a photoelectric conversion device 40 which in turn comprises a transparent electrode 41 upon which an optical image is projected from the left-hand side by means of an optical system not shown, a photoconductive material layer 42, a reflecting layer 43, an intensity control element 44, and another transparent electrode 45. A voltage source 46 is connected between the electrodes 41 and 45.

The optical image projected on the electrode 41 causes the local resistance of the photoconductive material layer 42 to decrease in response to the luminance level of the picture elements. Therefore, the resistance of the portions of the layer 42 corresponding to the bright picture elements of the optical image becomes lower than those corresponding to the dimmer picture elements, with the result that a voltage pattern representative of the original image is developed within the element 44.

As already described, the device of the invention is constructed so that linearly polarized rays may be projected by means of the semi-transparent reflecting member on the element for rotation of the plane of polarization, so that the voltage pattern may be developed within the element in response to the original optical image, and so that the output light beam may be derived by means of the analyzer to reproduce an intensified replica of the original image. Inasmuch as the luminance of the intensified replica does not depend on that of the original image but rather on the intensity of illumination by the light source 21, intensification to any arbitrary degree will be realized without regard to the luminance of the original image. Moreover, the device of the invention can be used not only as an image intensifying device but also as a light-and-shade or light and dark reversing device, merely by adjusting the angular position of the polarizer and/or the analyzer into parallel polarizer-analyzer relative relation. Thus a positive picture can be made into a negative, and vice versa. More specifically, as has been mentioned with reference to FIG. 2, the light-and-shade reversal can be performed by arranging the analyzer, whose optical axis was placed perpendicular to that of the polarizer when the device serves as an image intensifying device, in parallel with that of the polarizer. Therefore, it will be appreciated, in addition to image intensification, the invention also may be employed to produce reversal of the light and shade portions of the original optical image as desired.

In order to secure a contrast of high fidelity, it would be preferable to adjust before operation, the voltage applied across the intensity control element, so that the high light picture elements of the original image may cause 90-degree rotation of the plane of polarization in the linearly polarized rays. Also, as noted, by suitably cooling the intensity controlling element, the voltage required for the element can be considerably reduced.

Further concerning the embodiments of FIGS. 3 and 4, an alternating current voltage source may be substituted for the voltage sources 346 and 46. In such case, the intensity of the light beam from the light source should be synchronized with the alternating current voltage from its source. Further as to the alternating current voltage, inasmuch as the electrical resistance of the intensity control element measured in the surface direction increases compared with that measured in the thickness direction, considerably improved resolving power can be achieved compared with the case where direct current voltage is employed and where the resolving power depends solely on the thickness of the intensity control element.

In the above embodiments, the optical system comprising the polarizer 23, the analyzer 25, and the semi-transparent reflecting member 26 may be replaced, for the purpose of preventing absorption loss at the elements, with a "double" Nicol prism. The latter may comprise a Nicol prism with a rectangular total-reflection prism combined in such a manner that the light beam passing through the Nicol prism and subjected to linear polarization may be totally reflected by means of the rectangular prism in the direction of the optical axis of the element which produces the greatest electro-optical effect. Also the reflected light beam from the electro-optical-effect element may be redirected through the reversed light path through the total-reflection prism and the Nicol prism. Further, a laser may be substituted for the light source 21. With a laser used as the light source, improved resolving power will be achieved, because of the coherency of the laser light beam. Moreover, a source of ultraviolet rays may also be used as the light source. In such case, a fluorescent screen should be substituted for the screen 28.

While the foregoing description sets forth the principles of the invention in connection with specific apparatus, it is to be understood that the description is made only by way of example and not as a limitation of the scope of the invention as set forth in the objects thereof and in the accompanying claims.

What is claimed is:

1. An optical image amplifier comprising
   a glass envelope having a pair of oppositely disposed transparent surfaces with one surface exposed to an optical image focused thereon,
   a photo-electron-emissive material placed on said one envelope surface on the inner side thereof to produce electrons representative of the image focused on said one glass envelope surface.
   means for accelerating said image-representing electrons towards the other surface of said glass envelope,
   a multi-layer light polarizing device having in sandwiched relationship a thin film electron-transparent electrode layer, a semiconductor electron-sensitive variable resistance layer, a light reflector layer, a light polarizer layer, and a light-transparent thin film electrode with the light-transparent thin film electrode adjacent the other surface,
   means for producing a linearly polarized beam of light through the other surface of the glass envelope, the thin film electrode and the light polarizer layer to the reflector layer,
   a bias voltage applied across the first electrode and the transparent thin film electrode to establish through the semiconductor layer an electric field in the polarizing layer, said field being substantially transverse to the surface of the polarizing layer and being varied in response to resistance changes caused in the semiconductor material by electrons being accelerated from said one surface,
   means responsive to the light reflected by the reflector layer for detecting polarization changes thereof and providing an amplified light image.

2. A device for amplifying a light image comprising means for producing a source of intense linearly polarized beam of light, a multi-layered light polarizing device having in sandwiched relationship an electron-transparent electrode layer, a semiconductor electron-sensitive variable resistance layer, a light reflector layer, a light polarizer layer and a light-transparent electrode, said polarized beam of light being directed onto the reflector layer through the polarizer layer, means responsive to a light image for producing a beam of electrons representative of the light image and accelerating said electrons through the electron-transparent electrode layer onto the semiconductor layer to vary the resistance thereof, means applying a bias voltage across the electrode layers to produce an electric field in the polarizing layer, said field being substantially transverse to the surfaces of the light polarizing layer and being varied in response to resistance changes caused in the semiconductor material by the electrons incident thereon, and means responsive to the light reflected by the reflector layer for detecting polarization changes thereof and providing a light amplified image.

References Cited

UNITED STATES PATENTS

| | | | |
|---|---|---|---|
| 2,276,360 | 3/1942 | Von Ardenne | 350—150 X |
| 2,277,007 | 3/1942 | Von Ardenne | 350—150 X |
| 2,297,443 | 9/1942 | Von Ardenne | 350—150 X |
| 2,411,155 | 11/1946 | Gorn | 350—150 X |
| 2,640,162 | 5/1953 | Espenschied et al. | 250—213 X |
| 2,892,380 | 6/1959 | Baumann et al. | 250—213 X |
| 2,983,824 | 5/1961 | Weeks et al. | 350—150 X |
| 3,015,693 | 1/1962 | Volberg et al. | |
| 3,247,389 | 4/1966 | Kazan | 250—213 |

RALPH G. NILSON, Primary Examiner

T. N. GRIGSBY, Assistant Examiner

U.S. Cl. X.R.

250—225; 350—150